United States Patent [19]

Humberstone

[11] Patent Number: 4,916,032
[45] Date of Patent: Apr. 10, 1990

[54] CLAD METAL

[75] Inventor: Kenneth J. Humberstone, Pepper Pike, Ohio

[73] Assignee: The American Tank & Fabricating Company, Cleveland, Ohio

[21] Appl. No.: 283,286

[22] Filed: Dec. 12, 1988

[51] Int. Cl.⁴ ............................................. B32B 15/18
[52] U.S. Cl. ..................................... 428/683; 428/685
[58] Field of Search ............................... 428/683, 685; 148/11.5 Q; 430/265

[56] References Cited

U.S. PATENT DOCUMENTS

| Re. 28,964 | 9/1976 | Nuses et al. | 148/12 E |
|---|---|---|---|
| 1,757,790 | 5/1930 | Armstrong | 228/131 |
| 1,896,411 | 2/1933 | Maskrey | 428/682 |
| 2,059,584 | 11/1936 | Johnson | 228/118 |
| 2,159,043 | 5/1939 | Orr | 228/118 |
| 2,468,206 | 4/1949 | Keene et al. | 428/584 |
| 2,514,873 | 7/1950 | Keene et al. | 428/584 |
| 2,537,207 | 1/1951 | Carlson et al. | 428/583 |
| 2,704,883 | 3/1955 | Hamilton et al. | 228/175 |
| 3,055,096 | 9/1962 | Bertossa | 428/686 |
| 3,393,445 | 7/1968 | Ulam | 228/118 |
| 3,454,373 | 5/1966 | Ornstein | 428/617 |
| 3,475,812 | 11/1969 | Kennedy et al. | 228/190 |
| 3,601,884 | 8/1971 | Kemeny | 228/160 |
| 3,893,205 | 7/1975 | Anderson et al. | 16/121 |
| 3,956,809 | 5/1976 | Chivinsky | 428/683 |
| 4,201,837 | 5/1980 | Lupinski | 428/457 |
| 4,485,839 | 12/1984 | Ward | 164/463 |
| 4,497,661 | 2/1985 | Valenti | 75/256 |

FOREIGN PATENT DOCUMENTS

| 2119044 | 3/1972 | Fed. Rep. of Germany | 428/683 |
|---|---|---|---|
| 2413161 | 10/1975 | Fed. Rep. of Germany | 428/685 |
| 53-80317 | 7/1978 | Japan | 428/683 |
| 53-80320 | 7/1978 | Japan | 428/683 |
| 55-48468 | 4/1980 | Japan | |
| 56-6793 | 1/1981 | Japan | |

Primary Examiner—Deborah Yee
Attorney, Agent, or Firm—Calfee, Halter & Griswold

[57] ABSTRACT

A clad metal comprising at least one layer of rephosphorized carbon steel metallurgically bonded to at least one layer of stainless steel. In a preferred embodiment the rephosphorized carbon steel layer comprises at least about 0.05 weight percent phosphorus and the stainless steel layer comprises a type 444 stainless steel. A clad metal made in accordance with the present invention may be produced into any one of a variety of shaped, configurations or parts including, for example, slabs, blooms, sheet strip or finished parts. Once the clad metal has been produced by forming a metallurgical bond between the various components thereof, the clad metal may be subjected to further processing including, for example, forging, stamping, rolling, welding, machining, and the like. The invention further provides a unique parting compound for use in the production of clad metals which are clad on only one side. Such parting compound comprises a mixture of levigated alumina and an inert binder. Preferably, the inert binder comprises water glass.

16 Claims, 2 Drawing Sheets

CLAD METAL

DISCLOSURE

This invention relates to a clad metal. More particularly, this invention relates to an improved clad metal comprising one component or layer of rephosphorized carbon steel metallurgically bonded to one or more components or layers of stainless steel. This invention further relates to a new parting compound for use in the production of clad metal which is clad only on one side. This parting compound may be utilized to produce single side clad metal from any one of a variety of combinations of metal including the aforementioned combination of a rephosphorized carbon steel and a stainless steel.

BACKGROUND OF THE INVENTION

Clad metals appeal to those in the fabricating arts because they combine the attributes of different metals into a single piece of material. More particularly, clad metals combine the high conductivity, good workability and low cost of carbon-steels, with the high hardness, good corrosion resistance and superior surface finish of stainless steels.

Examples of prior art references which concern clad metals are as follows: Armstrong U.S. Pat. No. 1,757,790, Maskrey U.S. Pat. No. 1,896,411, Johnson U.S. Pat. No. 2,059,584, Orr U.S. Pat. No. 2,159,043, Keene et al U.S. Pat. No. 2,468,206, Keene et al U.S. Pat. No. 2,514,873, Carlson et al U.S. Pat. No. 2,537,207, Hamilton et al U.S. Pat. No. 2,704,883, Bertossa U.S. Pat. No. 3,055,096, Ulam U.S. Pat. No. 3,393,445, Ornstein U.S. Pat. No. 3,454,373, Kennedy et al U.S. Pat. No. 3,475,812, Kemeny U.S. Pat. No. 3,601,884 and Chivinsky U.S. Pat. No. 3,956,809.

The foregoing references reveal some of the specific combinations of metals used in producing clad metals. Additionally, the foregoing references discuss some of the problems encountered in producing clad metals which display adequate bond strength between the individual components of the clad metal. The foregoing references also discuss various methods and techniques for producing clad metals including the method disclosed by Ulam for producing clad metal which is clad only on one side.

SUMMARY OF THE INVENTION

The present invention provides a new and useful clad metal which is formed by an unusual combination of metals. The clad metal of the present invention combines a layer of rephosphorized carbon steel with a layer of stainless steel. Preferably, the stainless steel comprises a ferritic type stainless steel. A clad metal made in accordance with the present invention displays excellent bond strength between the individual layers or components despite the relatively high phosphorus content of the core.

The present invention further provides a unique parting compound for use in producing clad metal which is clad only on one side This unique parting compound may be utilized to produce single side clad metal from any one of a variety of combinations of metal including the preferred rephosphorized carbon steel and stainless steel combination disclosed herein.

A clad metal made in accordance with the present invention comprises one component of rephosphorized carbon steel metallurgically bonded to one component of stainless steel. In a preferred embodiment the invention comprises a sandwich-like clad metal plate having a rephosphorized carbon steel core and a stainless steel layer metallurgically bonded to each of its major surfaces. The rephosphorized carbon steel core comprises at least about 0.050 weight percent phosphorus. Preferably, the rephosphorized carbon steel core comprises at least about 0.05 weight percent phosphorus, about 0.07 weight percent to about 0.16 weight percent carbon, about 0.8 weight percent to about 1.30 weight percent manganese, about 0.02 weight percent to about 0.09 weight percent silicon, and about 0.02 weight percent to about 0.08 weight percent aluminum. An example of a steel having the aforementioned composition which is suitable for use in the present invention is a rephosphorized carbon steel sold by the assignee of present invention under the trademark AMERA-MAG. AMERA-MAG is a registered trademark of The American Tank and Fabricating Company of Cleveland, Ohio, U.S.A.

Various methods known to those skilled in the art may be used to produce a clad metal according to the invention. For example, a metallurgical bond may be produced between the rephosphorized carbon steel component and the stainless steel component by such techniques as casting, rolling, welding, isostatic pressing, and the like. Additionally, such techniques as the evacuation of air or the injection of inert gases and deoxidizing getters into the area between the rephosphorized carbon steel component and the stainless steel component may also be used in order to possibly enhance the metallurgical bond.

In the preferred embodiment the clad metal utilizes type 444 ferritic stainless steel layers or components. Such type 444 stainless steel comprises less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

The clad metal plate of the preferred embodiment is produced by first constructing a conventional sandwich-like composite slab which is commonly used for producing clad metal that is clad only on one side. Such a composite slab is disclosed in Ulam U.S. Pat. No. 3,393,445 the disclosure of which is incorporated herein by reference. In accordance with the disclosure of Ulam, the preferred composite slab comprises two plates of type 444 stainless steel sandwiched between two plates of rephosphorized carbon steel. Enclosing the ends of the stainless steel plates are rephosphorized carbon steel side and end plates.

Disposed between the plates of stainless steel is a unique parting compound made in accordance with the present invention. This parting compound does not require the venting of the composite slab as does the volatile lacquer base parting compound disclosed by Ulam and it is suitable for use in the production of various types of clad metals which are clad only on one side, including the rephosphorized carbon steel and stainless steel combination of the preferred embodiment. This unique parting compound comprises a combination of levigated alumina (water and alumina powder) and an inert binder mixed together in such proportions as to allow the mixture to be easily applied to the plates and securely retained on the surfaces of the plates during subsequent handling of both the plates and the composite slab. Preferably, the inert binder utilized to produce the parting compound is water glass (sodium silicate).

A metallurgical bond is formed between the outer rephosphorized carbon steel plates and the inner stainless steel plates by hot rolling the sandwich-like slab into a sandwich-like clad metal plate of reduced thickness. Subsequent to hot rolling, the sandwich-like clad metal plate may be appropriately sheared or cut and the two clad metal stainless steel plates separated, the parting compound preventing a metallurgical bond from forming between the stainless steel plates. These sections of clad metal may then be shaped, fabricated and formed into any one of a variety of items including magnesium or aluminum melting crucibles.

As discussed in applicant's U.S. Pat. No. 4,424,436, entitled "Crucibles For Molten Magnesium And Method Of Forming", the forming of type 444 ferritic stainless steel can be extremely difficult because of its inherent brittleness. A composite constructed according to the present invention is believed to be preferable to solid type 444 stainless steel for forming parts such as crucibles in wall thicknesses of 0.75 inch or more because the utilization of a clad piece of metal would require less bending or forming as opposed to a solid piece of type 444 stainless steel of equal thickness.

In addition to improved formability, substantial material cost savings can be realized by producing crucibles in accordance with the present invention. These savings are possible because rephosphorized carbon steels are available at a fraction of the cost of most stainless steels.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the present invention may be employed.

DETAILED DESCRIPTION OF THE PREFERRED EMBODIMENT

Figure 1:
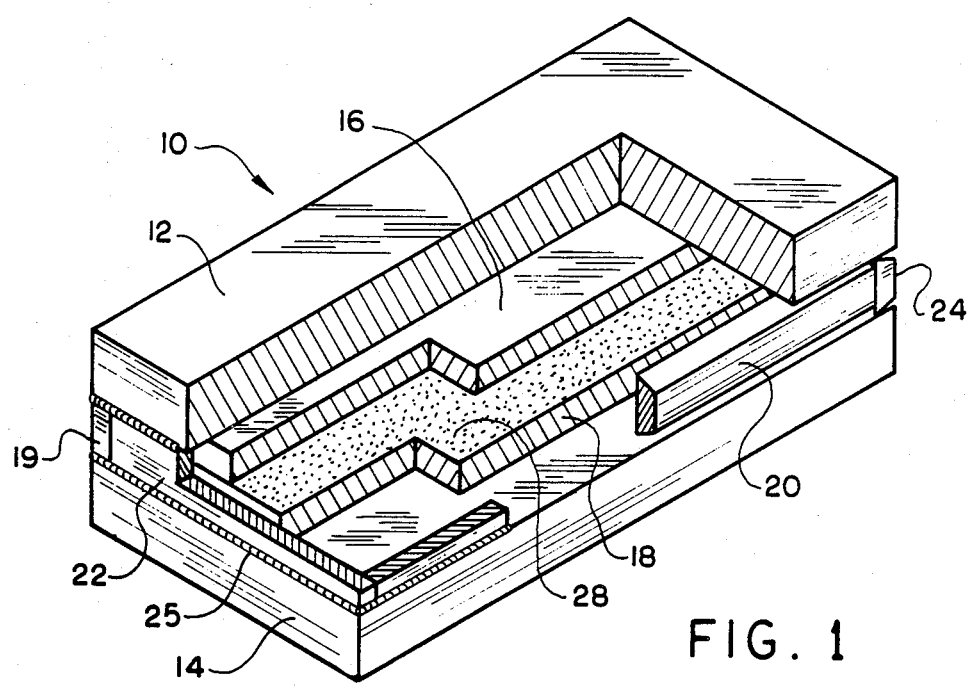
FIG. 1 is a schematic, broken-away three-dimensional view of a sandwich-like composite slab which may be utilized to produce a clad metal made in accordance with the present invention.

Referring initially to FIG. 1, there is illustrated a composite sandwich-like metal slab 10 made in accordance with the present invention prior to the metallurgical bonding of the various components which comprise the slab 10. The composite 10 comprises a pair of outer rephosphorized carbon steel plates or components 12 and 14 sandwiching and surrounding a pair of stainless steel plates or components 16 and 18. Enclosing the ends of the stainless steel plates 16 and 18 are rephosphorized carbon steel side components 19 and 20 which extend along the lateral edges of the stainless steel plates 16 and 18, and rephosphorized carbon steel end components 22 and 24 which extend along the end surfaces of the stainless steel plates 16 and 18.

In order to facilitate the production of the composite slab 10, a series of weld beads 25 are included along all intersecting edges. These welds serve to securely hold the various rephosphorized carbon steel plates 12, 14, 19, 20, 22 and 24 in position about the stainless steel plates 16 and 18 prior to imparting the metallurgical bond between the stainless steel plates 16 and 18 and the respective rephosphorized carbon steel plates 12 and 14. Prior to assembling the various components of the composite slab 10, preferably all mating surfaces between the pieces of rephosphorized steel and the pieces of stainless steel and rephosphorized steel are appropriately cleaned such as by shot blasting.

Disposed between the stainless steel plates 16 and 18 is a parting compound 28. Parting compound 28 serves to prevent a metallurgical bond from forming between the stainless steel plates 16 and 18 during the hot rolling of slab 10 thereby ensuring that the plates 16 and 18 can be easily separated after rolling.

Parting compound 28 preferably comprises a mixture of levigated alumina (water and alumina) and an inert binder. Preferably, the inert binder utilized to produce parting compound 28 is water glass (sodium silicate). The individual components of the mixture must be mixed together so as to provide a mixture which can be easily applied (with such techniques as brushing or spraying), and which will readily adhere without cracking and flaking during the subsequent handling of both the stainless steel plates 16 and 18 and the slab 10.

Although applicant's unique parting compound 28 is utilized in the preferred embodiment for the production of a clad metal comprising stainless steel and rephosphorized carbon steel, it will be appreciated that parting compound 28 is suitable for use in constructing various types of clad metals comprising a combination of a variety of metals, such as the combination of any carbon steel with a stainless steel, and is in no way limited for use with the illustrated stainless steel and rephosphorized carbon steel combination.

Because applicant's unique parting compound 28 is inert, no vent hole or opening is required in the slab 10. Thus, if desired, provisions may be undertaken to evacuate any air that may be contained in the slab 10 or to inject inert gasses or deoxidizing getters into the slab 10 between the various components thereof. Such evacuation or injection techniques may possibly enhance the metallurgical bond which is later formed between the stainless steel and the rephosphorized carbon steel.

Figure 2:
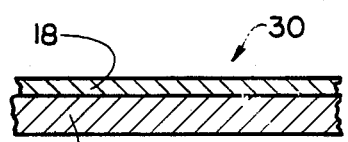
FIG. 2 is a broken away cross-sectional view of a piece of clad metal made in accordance with the present invention.

Although the applicant cannot explain the unexpected results which are achieved by the use of a rephosphorized carbon steel in constructing the composite slab 10 which is later utilized to produce the clad metal 30 shown in FIG. 2, applicant does believe that such rephosphorized carbon steel should comprise at least about 0.050 weight percent phosphorus. Thus, for the purposes of this invention a rephosphorized carbon steel is defined as any steel having a phosphorus content of at least about 0.050 weight percent. This definition in no way implies a particular means or method of producing the rephosphorized carbon steel. Various means of producing a rephosphorized carbon steel for use with the present invention may be employed. For example, the rephosphorized carbon steel may be produced by adding phosphorus bearing alloys to the melt, or it may be produced by utilizing steel scrap in the melt having sufficient phosphorus content to produce a final melt composition in excess of about 0.050 weight percent phosphorus.

Applicant has also found that advantageous results may be achieved by limiting the carbon content of the rephosphorized carbon steel to no more than about 0.16 weight percent carbon. Preferably, the invention should be practiced utilizing a rephosphorized carbon steel core containing at least about 0.05 weight percent phosphorus, about 0.07 weight percent to about 0.16 weight percent carbon, about 0.8 weight percent to about 1.30 weight percent manganese, about 0.02 weight percent to about 0.09 weight percent silicon, and about 0.02 weight percent to about 0.08 weight percent aluminum. An example of a rephosphorized carbon steel having the aforementioned composition which is suitable for use in the production of clad metals is a rephosphorized carbon steel sold under the trademark AMERA-MAG. AMERA-MAG is a registered trademark of The American Tank and Fabricating Company of Cleveland, Ohio, U.S.A.

With respect to the stainless steel layers or components 14 and 16, for the purposes of the present invention a stainless steel is defined as a steel having a chromium content of at least about 4 weight percent. In practicing the invention, applicant has obtained excellent bonding characteristics between the rephosphorized carbon steel core 12 and the stainless steel components 14 and 16 by utilizing a ferritic stainless steels. More specifically, excellent results have been obtained by utilizing a type 444 ferritic stainless steel manufactured by the Jessop Steel Corporation of Washington, Penna. Typically, this type 444 stainless steel comprises less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

Although to date applicant's tests have been limited to a ferritic type stainless steel, applicant believes that acceptable results may be obtained by utilizing any type of stainless steel in conjunction with the rephosphorized carbon steel. For example, applicant believes that the teachings of the present invention are also suitable for use with austenitic and martensitic type stainless steels or any other type of stainless steel having a metal matrix with a ferritic, austenitic, or martensitic structure, or any combination of the aforementioned structures.

Referring once again to FIG. 1, in the preferred embodiment the stainless steel plates 16 and 18 are metallurgically bonded to the respective rephosphorized carbon steel plates 12 and 14 by first heating the sandwich-like slab 10 until the stainless steel plates 16 and 18 are fully austenitized or to a soaking temperature of about 2000° F. to about 2300° F. Subsequent to a thorough soak the metallurgical bonds are imparted into the composite slab 10 by subjecting it to a hot rolling reduction of preferably at least about 3 to 1 (that is, for example, a reduction in thickness from about six inches to about two inches). Such hot rolling produces a sandwich-like composite plate of reduced thickness which has the same general configuration through its thickness as slab 10. This plate is then sheared along its edges to permit the separation of the two stainless steel plates 16 and 18 from one another along the parting compound 20. Upon separation a pair of clad metal plates are provided, one of these plates being shown in FIG. 2 and identified by the number 30. The hot rolling reduces the thickness of the various components of slab 10 and it causes a metallurgical bond to form between the stainless steel plates 16 and 18 and the respective rephosphorized carbon steel plates 12 and 14. Although preferably a 3 to 1 reduction may be utilized, it will be appreciated that depending upon mill conditions, the number of passes being taken and the dimensions of the slab, ingot, plate or the like being rolled, a smaller reduction may result in the formation of a metallurgical bond between the various components.

For the purposes of this invention, a metallurgical bond is defined as a metallic bond between the atoms of the rephosphorized carbon steel and the atoms of the stainless steel. Thus, in addition to utilizing hot rolling as mentioned above to produce a metallurgical bond between the rephosphorized carbon steel and the stainless steel, a variety of other methods may be utilized such as isostatic pressing, forging, welding, and the like.

Once a metallurgical bond has formed between the rephosphorized carbon steel plates 12 and 14 and the respective stainless steel plates 16 and 18, the clad metal plate 30 may be used as is or it may be subjected to further processing. Such processing may include further hot rolling, cold rolling, forging, stamping, machining, welding and the like.

Figure 3:
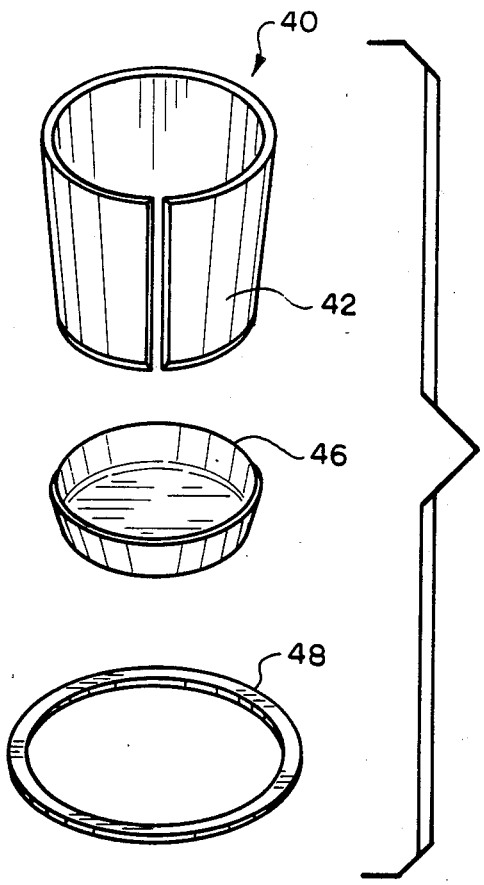
FIG. 3 is an exploded perspective view of the various parts of a crucible produced from clad metal made in accordance with the present invention.
Figure 4:
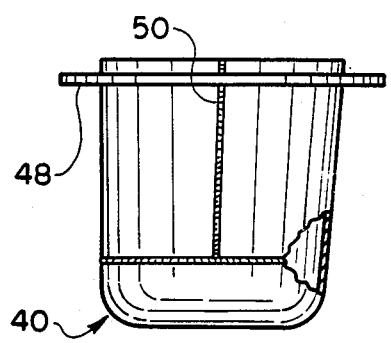
FIG. 4 is an elevated side view of the crucible of FIG. 3 in the fully assembled condition.

More particularly, for example, subsequent to the hot rolling of the composite slab 10 into clad metal plates 30, clad metal plates 30 may be cut into a plurality of sections and formed into a variety of shaped pieces for use in the construction of a magnesium or aluminum melting crucible 40 as illustrated in FIGS. 3 and 4. The specific formed pieces which comprise crucible 40 are illustrated in FIG. 3. Specifically, crucible 40 comprises a circular side wall 42, a circular base 46, and a collar 48, all of which may be formed utilizing sections of the clad metal plate 30. As shown in FIG. 4, the various formed pieces 42, 46 and 48 are assembled by producing a weld bead 50 along the intersecting edges of the side wall 42, base 46 and collar 48. Preferably, when applying the weld bead 50 a welding rod having a composition compatible with the composition of the stainless steel which forms clad plate 30 is utilized.

Crucibles 40 which are produced from clad metal plate 30 should exhibit lifetimes considerably greater than that of cast or fabricated plain carbon and low allow carbon steel crucibles. Also, the production of crucibles 40 should be simplified because of the increased formability of the clad metal plate 30 as compared to a solid type 444 stainless steel plate. Finally, crucibles 40 may be produced at a fraction of the cost of conventional crucibles which employ solid stainless steel throughout.

Although in the above described preferred embodiment a clad metal plate 30 formed from a sandwich-like slab 10 has been illustrated and described, it will be appreciated that clad metal made in accordance with the principles of this invention may be produced from various starting configurations or shapes such as ingots, blooms or rounds. For example, instead of forming a sandwich-like slab 10, a sandwich-like ingot may be formed with a rephosphorized core surrounded by outer stainless steel layers, and a metallurgical bond may be formed between the core and the various outer layers of the ingot during the conversion of the ingot to thereby produce a clad metal slab, bloom, plate, sheet or strip. Likewise, it will be appreciated that clad metal made in accordance with the present invention may embody a configuration which is different from the one side clad configuration of clad metal plate 30. For example, such alternative configurations may comprise a rephosphorized carbon steel core having a stainless steel layer metallurgically bonded to both its major surfaces or to only a portion of one of its major surfaces. Furthermore, it will be appreciated that clad metal made in accordance with the present invention may be produced directly into finished parts, such as by isostatic pressing, with no additional processing. During the isostatic pressing operation a metallurgical bond is formed between the components of the clad metal part. Clad metal finished parts may embody any one of a variety of items such as heat exchangers, valve bodies, and the like.

Finally, it will be appreciated that clad metals produced in accordance with the present invention may be further fabricated into a multitude of products in addition to the illustrated crucible 40.

Although the invention has been shown and described with respect to a certain preferred embodiment, it is obvious that equivalent alterations and modifications will occur to others skilled in the art upon the reading and understanding of this specification. The present invention includes all such equivalent alterations and modifications, and is limited only by the scope of the following claims.

I claim:

1. A clad metal comprising at least one layer of rephosphorized carbon steel and at least one layer of stainless steel metallurgically bonded to said rephosphorized carbon steel layer, said carbon steel layer comprising at least about 0.050 weight percent phosphorus.

2. A clad metal as set forth in claim 1 wherein said stainless steel component comprises a ferritic stainless steel.

3. A clad metal as set forth in claim 1 wherein said rephosphorized carbon steel layer comprises not more than about 0.16 weight percent carbon.

4. A clad metal as set forth in claim 3 wherein said stainless steel layer comprises a ferritic stainless steel.

5. A clad metal comprising at least one component of rephosphorized carbon steel and at least one component of stainless steel metallurgically bonded to said rephosphorized carbon steel component, said rephosphorized carbon steel component containing at least about 0.05 weight percent phosphorus, about 0.07 weight percent to about 0.16 weight percent carbon, about 0.8 weight percent to about 1.30 weight percent manganese, about 0.02 weight percent to about 0.08 weight percent silicon, and about 0.02 weight percent to about 0.08 weight percent aluminum.

6. A clad metal as set forth in claim 5 wherein said stainless steel component comprises a ferritic stainless steel.

7. A clad metal comprising a rephosphorized carbon steel core having two major surfaces and a stainless steel layer metallurgically bonded to each of said major surfaces, said carbon steel core comprises at least about 0.050 weight percent phosphorus.

8. A clad metal as set forth in claim 7 wherein said stainless steel layers comprise a ferritic stainless steel.

9. A clad metal as set forth in claim 8 wherein said rephosphorized carbon steel core comprises not more than about 0.16 weight percent carbon.

10. A clad metal as set forth in claim 7 wherein said rephosphorized carbon steel core contains at least about 0.05 weight percent phosphorus, about 0.07 weight percent to 11. A clad metal as set forth in claim 10 wherein said stainless steel layer comprises a ferritic stainless steel.

12. A clad metal comprising at least one layer of rephosphorized carbon steel and at least one layer of ferritic stainless steel metallurgically bonded to said rephosphorized carbon steel layer, said rephosphorized carbon steel layer comprising at least about 0.050 weight percent phosphorus, and said ferritic stainless steel comprising less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

13. A clad metal comprising at least one layer of rephosphorized carbon steel comprising at least about 0.050 weight percent phosphorus and not more than about 0.16 weight percent carbon and at least one layer of ferritic stainless steel metallurgically bonded to said rephosphorized carbon steel layer, said ferritic stainless steel layer comprising less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

14. A clad metal comprising at least one component of rephosphorized carbon steel and at least one component of ferritic stainless steel metallurgically bonded to said rephosphorized carbon steel component, said rephosphorized carbon steel component containing at least about 0.05 weight percent phosphorus, about 0.07 weight percent to about 0.16 weight percent carbon, about 0.8 weight percent to about 1.30 weight percent manganese, about 0.02 weight percent to about 0.08 weight percent silicon, and about 0.02 weight percent to about 0.08 weight percent aluminum, said ferritic stainless steel comprising less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

15. A clad metal comprising a rephosphorized carbon steel core having two major surfaces and a ferritic stainless steel layer metallurgically bonded to each of said major surfaces, said rephosphorized carbon steel core comprising not more than about 0.16 weight percent carbon and at least about 0.050 weight percent phosphorus, said ferritic stainless steel layers comprising less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

16. A clad metal comprising a rephosphorized carbon steel core having two major surfaces and a ferritic stainless steel layer metallurgically bonded to each of said major surfaces, said rephosphorized carbon steel core comprising at least about 0.05 weight percent phosphorus, about 0.07 weight percent to about 0.16 weight percent carbon, about 0.8 weight percent to about 1.30 weight percent manganese, about 0.02 weight percent to about 0.08 weight percent silicon, and about 0.02 weight percent to about 0.08 weight percent aluminum, said ferritic stainless steel comprising less than about 0.06 weight percent carbon, about 0.10 weight percent to about 0.35 weight percent manganese, less than about 0.04 weight percent phosphorus, less than about 0.04 weight percent sulfur, about 16.0 weight percent to about 20.0 weight percent chromium, about 0.10 weight percent to about 0.75 weight percent nickel, and about 1.8 weight percent to about 2.2 weight percent molybdenum.

* * * * *

UNITED STATES PATENT AND TRADEMARK OFFICE
CERTIFICATE OF CORRECTION

PATENT NO. : 4,916,032

DATED : April 10, 1990

INVENTOR(S) : Kenneth J. Humberstone

It is certified that error appears in the above-identified patent and that said Letters Patent is hereby corrected as shown below:

Column 8, line 7, after "to" please insert --about .16 weight percent carbon, about .8 weight percent to about 1.30 weight percent manganese, about .02 weight percent to about .08 weight percent silicon, and about .02 weight percent to about .08 weight percent aluminum.--

Signed and Sealed this

Twenty-eighth Day of May, 1991

Attest:

HARRY F. MANBECK, JR.

Attesting Officer

Commissioner of Patents and Trademarks